US009861085B2

(12) United States Patent
Maruoka et al.

(10) Patent No.: US 9,861,085 B2
(45) Date of Patent: Jan. 9, 2018

(54) DUAL-BEARING REEL

(71) Applicants: Shimano Inc., Sakai, Osaka (JP); Shimano Components (Malaysia) SDN. BHD., Pontian, Johor (MY)

(72) Inventors: Takanori Maruoka, Osaka (JP); Atsushi Yagara, Johor (MY); Sen Meng Soon, Johor (MY); Chun Wee Chew, Johor (MY)

(73) Assignees: Shimano Inc., Osaka (JP); Shimano Components (Malaysia) SDN. BHD., Johor (MY)

( * ) Notice: Subject to any disclaimer, the term of this patent is extended or adjusted under 35 U.S.C. 154(b) by 308 days.

(21) Appl. No.: 14/733,045

(22) Filed: Jun. 8, 2015

(65) Prior Publication Data
US 2016/0100563 A1  Apr. 14, 2016

(30) Foreign Application Priority Data

Oct. 10, 2014  (JP) .................................. 2014-209304

(51) Int. Cl.
| | |
|---|---|
| *A01K 89/01* | (2006.01) |
| *A01K 89/033* | (2006.01) |
| *A01K 89/0155* | (2006.01) |

(52) U.S. Cl.
CPC .......... *A01K 89/05* (2015.05); *A01K 89/0155* (2013.01); *A01K 89/045* (2015.05); *A01K 89/058* (2015.05)

(58) Field of Classification Search
CPC .... A01K 89/033; A01K 89/05; A01K 89/057; A01K 89/058; A01K 89/059
See application file for complete search history.

(56) References Cited

U.S. PATENT DOCUMENTS

| | | | |
|---|---|---|---|
| 5,161,750 A | 11/1992 | Hitomi | |
| 6,053,444 A * | 4/2000 | Yamaguchi | .......... A01K 89/015 242/275 |

(Continued)

FOREIGN PATENT DOCUMENTS

| | | |
|---|---|---|
| JP | 10-174540 A | 6/1998 |
| JP | 10-327722 A | 12/1998 |

(Continued)

OTHER PUBLICATIONS

Extended European Search Report of corresponding EP patent Application No. 15 17 1723.8 dated Feb. 12, 2016.

(Continued)

*Primary Examiner* — Emmanuel M Marcelo (74) *Attorney, Agent, or Firm* — Global IP Counselors, LLP (57) ABSTRACT

A brake device for a dual bearing real, includes a one-way clutch, an operating member and a pressing member. The one-way clutch has an inner race, an outer race and a rolling element, and receives rotation of a spool shaft only in a fishing-line casting direction through the outer race. The outer race is disposed on the outer peripheral side of the inner race, and is rotatable with respect to a reel unit. The rolling element is disposed between the inner race and the outer race. The operating member is disposed on the outer peripheral side of an end of the spool shaft, and is engaged with the reel unit so as to be movable in a spool shaft direction. The pressing member is configured to press the outer race. The outer race is restricted from moving oppositely to the pressing member in the spool shaft direction.

17 Claims, 8 Drawing Sheets

(56) References Cited

U.S. PATENT DOCUMENTS

| | | | |
|---|---|---|---|
| 9,615,560 B2* | 4/2017 | Yin | A01K 89/033 |
| 2001/0038052 A1* | 11/2001 | Oishi | A01K 89/015 |
| | | | 242/255 |
| 2003/0038200 A1* | 2/2003 | Chiba | A01K 89/017 |
| | | | 242/249 |
| 2009/0173815 A1 | 7/2009 | Lee | |
| 2010/0006688 A1* | 1/2010 | Ikuta | A01K 89/033 |
| | | | 242/297 |
| 2010/0006689 A1* | 1/2010 | Ikuta | A01K 89/033 |
| | | | 242/306 |
| 2010/0006690 A1* | 1/2010 | Takechi | A01K 89/033 |
| | | | 242/396.5 |
| 2011/0315801 A1* | 12/2011 | Hayashi | A01K 89/0117 |
| | | | 242/247 |
| 2012/0248233 A1* | 10/2012 | Saito | A01K 89/0155 |
| | | | 242/289 |
| 2013/0181081 A1* | 7/2013 | Niitsuma | A01K 89/0155 |
| | | | 242/289 |
| 2016/0088825 A1* | 3/2016 | Ikebukuro | A01K 89/0189 |
| | | | 242/260 |

FOREIGN PATENT DOCUMENTS

| | | |
|---|---|---|
| JP | 11-215940 A | 8/1999 |
| JP | 2000-157120 A | 6/2000 |

OTHER PUBLICATIONS

Examination Report of corresponding EP Application No. 15 17 1723.8 dated Jun. 29, 2017.

* cited by examiner

DUAL-BEARING REEL

CROSS-REFERENCE TO RELATED APPLICATIONS

This application claims priority to Japanese Patent Application No. 2014-209304 filed on Oct. 10, 2014, the entirety of which is hereby incorporated by reference in its entirety.

BACKGROUND

Field of the Invention

The present invention relates to a dual-bearing reel, particularly to a brake device configured to brake a spool shaft in the dual-bearing reel.

Background Information

A dual-bearing reel is equipped with a brake device called a casting control mechanism configured to brake a spool shaft by making contact with the both ends of the spool shaft. A well-known brake device for casting control is configured to act even in winding a fishing line. Hence, rotational resistance occurs in winding the fishing line. In view of this, a type of well-known brake device has been produced that prevents occurrence of braking force with use of a one-way clutch in winding the fishing line (see e.g., Japan Laid-open Patent Application Publication No. H10-174540). The well-known brake device includes a tapered tube, a tapered coil spring and an operating member. The tapered tube is mounted in alignment with a gear and is configured to be unitarily rotated with the spool shaft. The tapered coil spring is contactable with the outer peripheral part of the tapered tube. The operating member is configured to extend and compress the tapered coil spring. One end of the tapered coil spring is hooked to the operating member, whereas the other end of the tapered coil spring makes contact with the gear. In the well-known brake device, when the spool shaft is rotated in a fishing-line casting direction, the coiled diameter of the tapered coil spring decreases and the tapered coil spring is wound onto the tapered tube. Thus, the spool shaft is braked through the tapered tube. By contrast, when the spool shaft is rotated in a fishing-line winding direction, the coiled diameter of the tapered coil spring increases and the tapered coil spring separates away from the tapered tube. Thus, braking of the spool shaft is released. The tapered coil spring herein functions as a one-way clutch and a brake member.

In the well-known brake device using the one-way clutch, the leading end (one end) of the coil spring is fixed to a braking three regulating knob (the operating member). Thus, rotational force inevitably acts on the braking force regulating knob in application of braking force. This may cause a situation that a braking force regulating position is displaced and braking force becomes unstable. On the other hand, the terminal end (the other end) of the coil spring makes contact with the gear configured to be unitarily rotated with the spool. Thus, even when the braking force regulating knob is loosened, frictional force is necessarily produced between the gear and the one-way clutch. Therefore, the brake device produces rotational resistance against the spool shaft in winding the fishing line.

SUMMARY

It is an object of the present invention to obtain a significant braking force and prevent the occurrence of rotational resistance against a spool shaft when winding a fishing line in a brake device configured to brake the spool shaft with use of a one-way clutch in a dual-bearing reel.

A dual-bearing reel according to the present invention includes a reel unit, a spool for winding a fishing line, a spool and a brake device. The spool is rotatable with respect to the reel unit. The spool shaft is rotatably supported by the reel unit and is configured to be unitarily rotated with the spool. The brake device is configured to brake the spool shaft. The brake device herein includes a one-way clutch, an operating member and a pressing member. The one-way clutch has a first inner race, a first outer race and a first rolling element. The first inner race is unitarily rotatable with the spool shaft. The first outer race is disposed on an outer peripheral side of the first inner race and is rotatable with respect to the reel unit. The first rolling element is disposed between the first inner race and the first outer race. Furthermore, the one-way clutch is configured to receive rotation of the spool shaft only in a fishing-line casting direction through the first outer race. The operating member is disposed on an outer peripheral side of a first end of the spool shaft, and is engaged with the reel unit so as to be movable in a spool shaft direction when being operated and rotated. The pressing member is configured to press the first outer race in conjunction with movement of the operating member. The first outer race is restricted from moving oppositely to the pressing member in the spool shaft direction with respect to the reel unit.

In the present dual-bearing reel, when the spool shaft is rotated in the fishing-line winding direction, the first inner race freely rotates and the rotation of the spool shaft is not transmitted to the first outer race. Thus, the brake device does not apply rotational resistance to the spool shaft. By contrast, when the spool shaft is rotated in the fishing-line casting direction, the rotation of the spool shaft is transmitted to the first outer race from the first inner race through the first rotting element. When the rotation is transmitted to the first outer race, the first outer race is braked while being pressed by the pressing member and being restricted from moving oppositely to the pressing member in the spool shaft direction with respect to the reel unit. Accordingly, the spool shaft is braked. The one-way clutch herein used is of a roller type, and hence, the brake device does not produce rotational resistance against the spool shaft in winding the fishing line. Furthermore, the first outer race is herein configured to be braked, and thus, the braking force occurs at a large diameter. Accordingly, the brake device can obtain a significant braking force. Moreover, the frictional area is enlarged, and this stabilizes braking force and enhances component durability.

The first inner race may be integrated with the spool shaft. In the construction, the one-way clutch can be simply constructed.

The pressing member may be a friction plate mounted to the operating member. In the construction, the first outer race can be braked on the side that the operating member is disposed.

The spool shaft may be rotatably supported by a rolling bearing. The rolling bearing has a second outer race, a second inner race and a second rolling element. The second outer race is located on an opposite side of the operating member through the one-way clutch and is non-rotatably mounted to the reel unit. The second inner race is mounted to an outer periphery of the spool shaft so as to be disposed closely to the first end. The second rolling element is disposed between the second outer race and the second inner race. Furthermore, the second inner race may be restricted from moving oppositely to the pressing member with respect to the spool shaft. In the construction, the first outer race can be braked while being restricted from axially moving by the pressing member and the rolling bearing that is restricted from moving oppositely to the pressing member with respect to the spool shaft.

The brake device may include an urging member disposed between the one-way clutch and the rolling bearing. In the construction, a range of braking force to be adjusted by the operating member is widened, and this enables minute adjustment of braking force.

The brake device may include a washer member that is disposed on an opposite side of the operating member through the one-way clutch and is mounted to the reel unit so as to be immovable oppositely to the pressing member. In the construction, the one-way clutch is not required to directly make contact with the reel unit. This enables accurate braking of the first outer race.

The brake device may include an urging member disposed between the one-way clutch and the washer member. In the construction, the range of braking force to be adjusted by the operating member is widened, and this enables minute adjustment of the braking force.

The operating member may be configured to press a first end side of the spool shaft. The one-way clutch may be mounted to the spool shaft so as to be disposed closely to a second end opposite to the first end. Furthermore, the pressing member may be mounted to the spool shaft so as to be capable of pressing the one-way clutch toward the second end. In the construction, the one-way clutch can be disposed on the opposite side of the side that the operating member is disposed (e.g., a handle side) in the dual-bearing reel. Thus, it is possible to prohibit an increase in the dimension of the dual-bearing reel in the spool shaft direction.

The brake device may include an urging member disposed between the pressing member and the one-way clutch. In the construction, the range of the braking force to be adjusted by the operating member is widened, and this enables minute adjustment of the braking force.

The urging member may be a disc spring disposed so as to be compressible. In the construction, the urging member can be disposed in a slight gap produced in the spool shaft direction. Thus, even when the urging member is provided, it is possible to prohibit an increase in the dimension of the brake device in the spool shaft direction.

Overall, according to the present invention, the one-way clutch herein used is of a roller type, and thus, the brake device does not produce rotational resistance against the spool shaft in winding the fishing line. Furthermore, the first outer race is herein braked, and hence, braking force occurs at a large diameter and frictional area is enlarged. Accordingly, large braking force is obtainable by the brake device.

BRIEF DESCRIPTION OF THE DRAWINGS

Referring now to the attached drawings which form a part of this original disclosure.

DETAILED DESCRIPTION OF EMBODIMENTS

<Schematic Construction of Dual-Bearing Reel>

Figure 1:
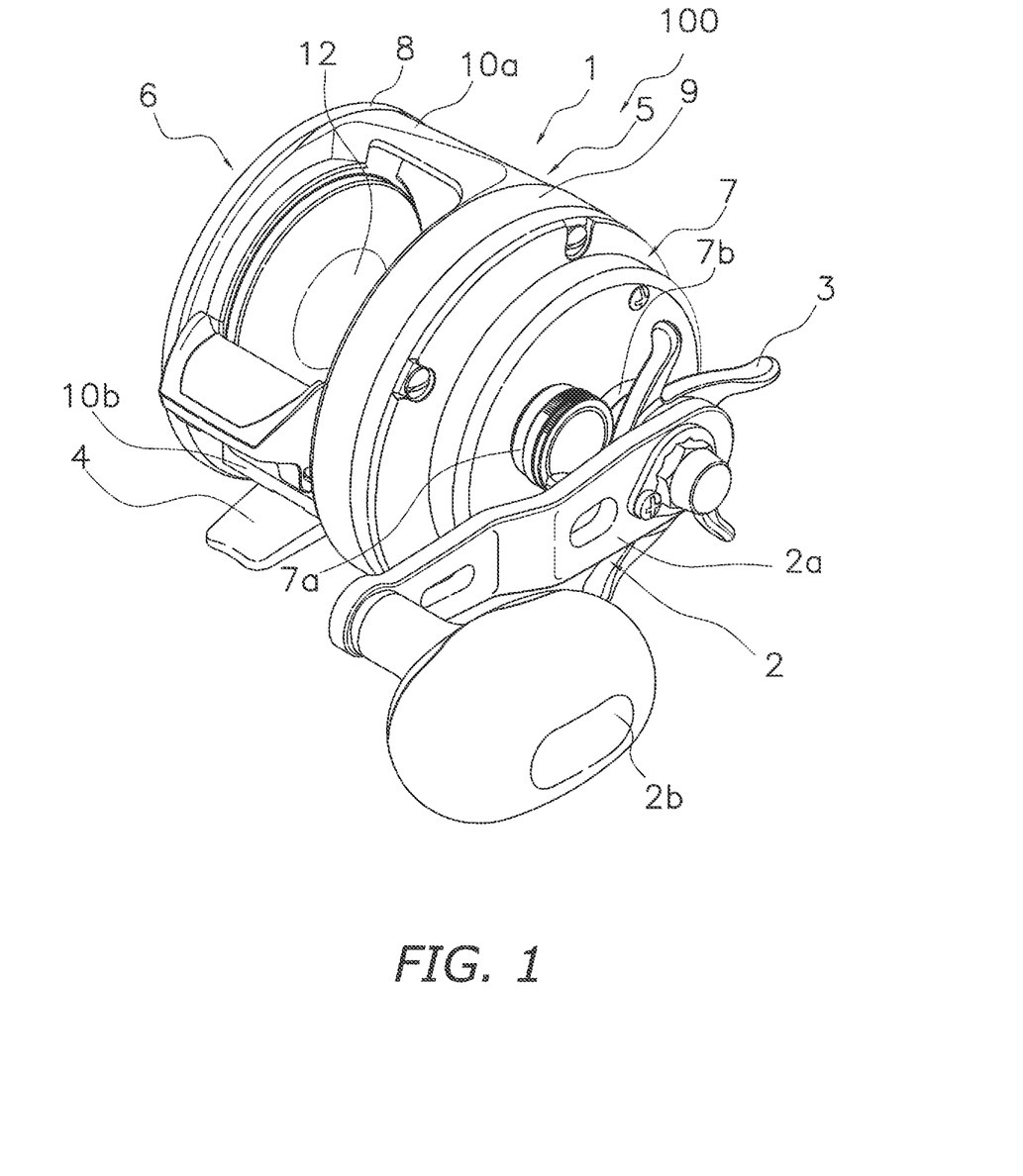
FIG. 1 is a perspective view of a dual-beating reel according to a first preferred embodiment of the present invention.
Figure 2:
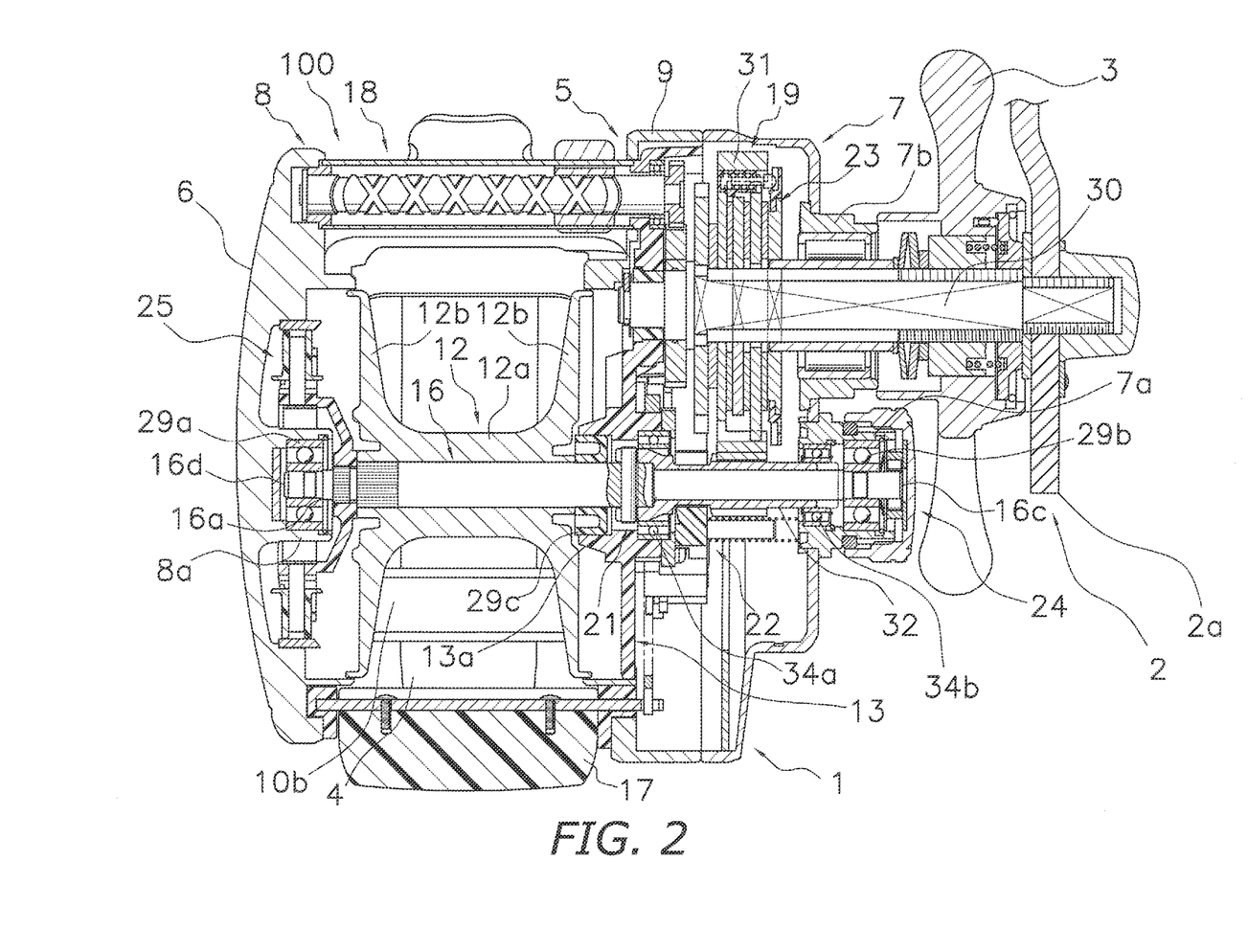
FIG. 2 is a cross-sectional view of the dual-bearing reel.

As shown in FIGS. 1 and 2, a dual-bearing reel 100 employing a preferred embodiment of the present invention includes a reel unit 1, a handle 2, a spool 12, a spool shaft 16 and a casting control mechanism 24.

The reel unit 1 includes a frame 5, first and second side covers 6 and 7 attached to the both lateral sides of the frame 5, and a mechanism mount plate 13. The frame 5 is composed of a first side plate 8, a second side plate 9, a front coupling portion 10a and a bottom coupling portion 10b. The first and second side plates 8 and 9 are disposed in opposition to each other at a predetermined interval. The front and bottom coupling portions 10a and 10b couple the first side plate 8 and the second side plate 9. A fishing rod attachment leg 4 for attaching a fishing rod is integrally formed with the bottom coupling portion 10b.

The first side cover 6 has a roughly circular shape when seen from the outside of the dual-bearing reel 100 in a spool shaft direction. The second side cover 7 is composed of two eccentric circular parts with different outer diameters. As shown in FIG. 2, the first side cover 6 is integrally formed with the first side plate 8. The first side plate 8 has a bearing accommodation part 8a in the center thereof. The bearing accommodation part 8a has a tubular shape and accommodates a bearing 29a.

Figure 3:
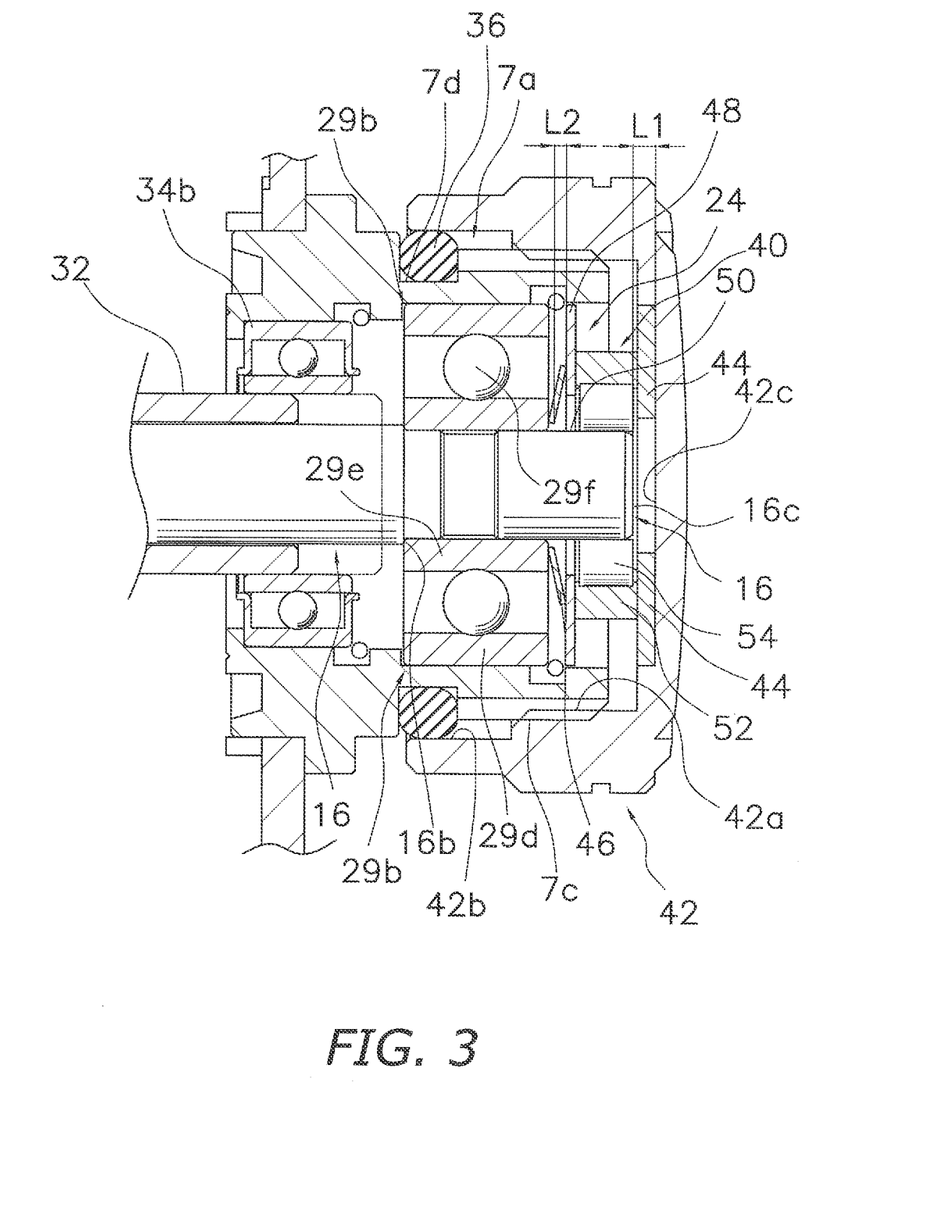
FIG. 3 is an enlarged cross-sectional view of a casting control mechanism according to the first preferred embodiment.
Figure 4:
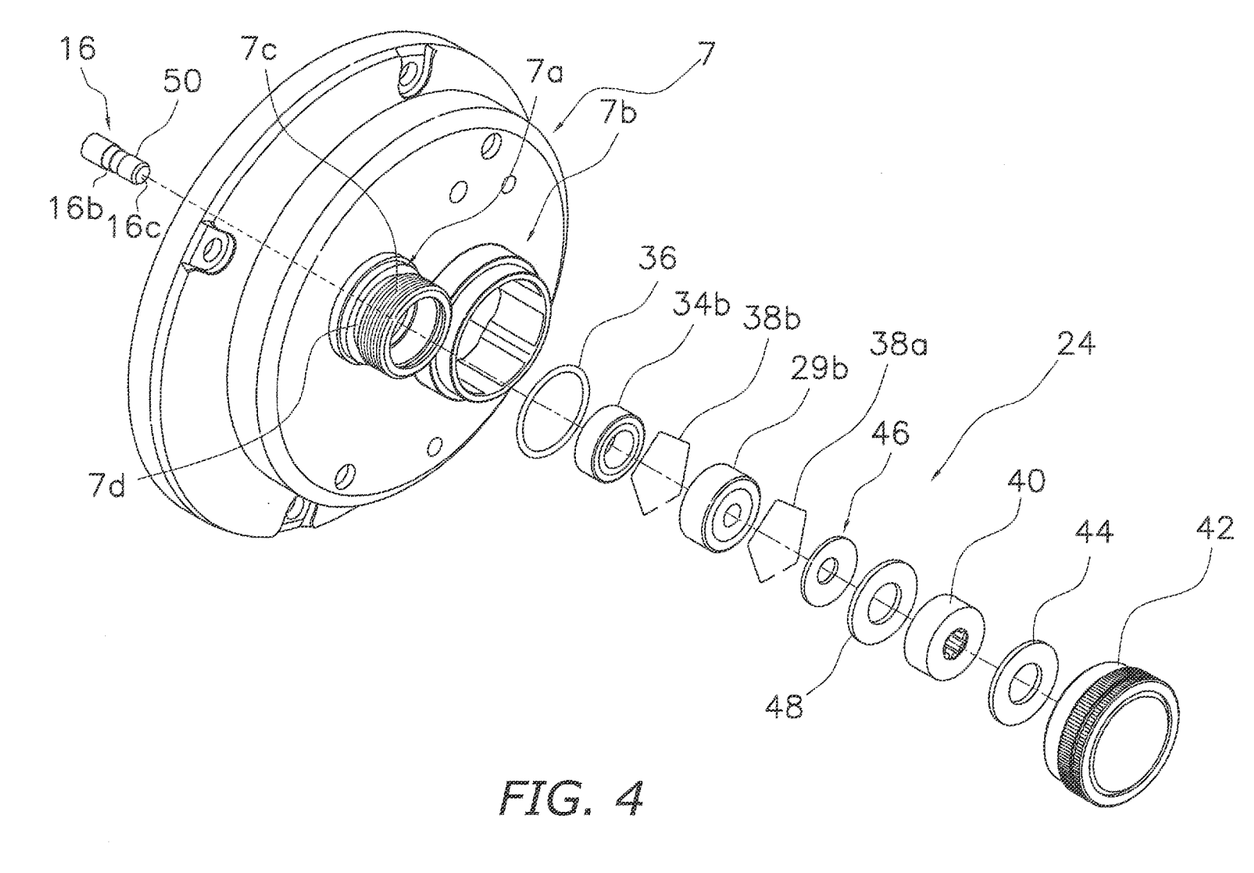
FIG. 4 is an exploded perspective view of the casting control mechanism according to the first preferred embodiment.

The second side cover 7 is fixed to the second side plate 9 by, for instance, three screws. The second side cover 7 has a first boss 7a and a second boss 7b. The first boss 7a supports the spool shaft 16 to be described, whereas the second boss 7b supports a drive shaft 30 to be described. Furthermore, the first boss 7a is disposed higher than and rearward of the second boss 7b. As shown in FIGS. 3 and 4, the first boss 7a has a male threaded part 7c and an annular groove 7d formed adjacently to the male threaded part 7c on the outer peripheral surface thereof. An operating member 42 to be described is screwed onto the male threaded part 7c. For example, a seal member 36, made in the form of O-ring with elasticity, is fitted to the annular groove 7d.

The mechanism mount plate 13 is provided for supporting the drive shaft 30, a pinion gear 32 and the spool shaft 16, which are to be described. The mechanism mount plate 13 is detachably attached to the second side cover 7, and is also detachably attached to the second side plate 9 while being integrated with the second side cover 7. The mechanism mount plate 13 has a support part 13a for supporting the pinion gear 32 and the spool shaft 16 in a rotatable state. The support part 13a has a tubular shape and protrudes from both surfaces of the mechanism mount plate 13.

As shown in FIG. 1, the handle 2 has a handle arm 2a and a handle knob 2b. The handle arm 2a is mounted to the drive shaft 30 (see FIG. 2) so as to be unitarily rotatable therewith.

The handle knob 2b is rotatably mounted to the tip end of the handle arm 2a. Furthermore, the handle arm 2a is disposed axially outside a star drag 3.

As shown in FIG. 2, the frame 5 accommodates the spool 12, a clutch lever 17 and a level wind mechanism 18. The clutch lever 17 serves as a thumb pad in thumbing the fishing line. The level wind mechanism 18 is configured to evenly wind the fishing line about the spool 12. A rotation transmission mechanism 19, a clutch mechanism 21, a clutch control mechanism 22, a drag mechanism 23 and the casting control mechanism 24 are disposed between the frame 5 and the second side cover 7. The casting control mechanism 24 is an exemplary brake device of the present invention. Furthermore, a centrifugal brake mechanism 25 is disposed between the frame 5 and the first side cover 6 in order to prohibit the occurrence of backlash when casting.

The rotation transmission mechanism 19 is configured to transmit rotational force from the handle 2 to the spool 12 and the level wind mechanism 18. As shown in FIG. 2, the rotation transmission mechanism 19 includes the drive shaft 30, a drive gear 31 fixed to the drive shaft 30, and the tubular pinion gear 32 meshed with the drive gear 31. The handle 2 is coupled to the tip end of the drive shaft 30 so as to be unitarily rotatable therewith. The drive gear 31 is coupled to the drive shaft 30 through the drag mechanism 23 so as to be unitarily rotatable therewith. When the drag mechanism 23 is actuated, the drive gear 31 is configured to be rotated with respect to the drive shaft 30. The pinion gear 32 is disposed on the outer peripheral side of the spool shaft 16, and functions as the clutch mechanism 21 as well. The pinion gear 32 is supported by the reel unit 1 through bearings 34a and 34b so as to be rotatable and axially movable. The bearing 34a is mounted to the support part 13a of the mechanism mount plate 13, whereas the bearing 34b is mounted to the first boss 7a so as to be axially aligned with a bearing 29b to be described as shown in FIG. 3.

As shown in FIG. 2, the clutch mechanism 21 is disposed in an intermediate position within the rotation transmission mechanism 19. The clutch mechanism 21 is switchable between a clutch-on state and a clutch-off state. The drive shaft 30 and the spool 12 are coupled in the clutch-on state and are decoupled in the clutch-off state. The clutch control mechanism 22 is configured to control and switch the clutch mechanism 21 between the clutch-on state and the clutch-off state in response to an operation of the clutch lever 17. When the clutch mechanism 21 is set in the clutch-off state, the spool 12 is freely rotatable and the fishing line is releasable. By contrast, when the clutch mechanism 21 is set in the clutch-on state, the fishing line is wind able about the spool 12 by rotation of the handle 2.

The spool 12 is a member for winding the fishing line and is rotatable with respect to the reel unit 1. The spool 12 is coupled to the spool shaft 16 so as to be unitarily rotatable therewith. The spool 12 has a bobbin trunk 12a and a pair of flanges 12b. The bobbin trunk 12a is a part around which the fishing line is wound. The flanges 12b are large diameter parts integrally formed with the both axial sides of the bobbin trunk 12a. The spool shaft 16 is coupled to the inner peripheral side of the bobbin trunk 12a of the spool 12.

The spool shaft 16 is rotatably supported by the reel unit 1. Specifically, the spool shaft 16 is rotatably supported by the reel unit 1 through three bearings 29a, 29b and 29c. The spool shaft 16 has a first end 16c and a second end 16d. The first end 16c is disposed on the handle 2 side, whereas the second end 16d is disposed on the opposite side of the first end 16c. Each of the first and second ends 16c and 16d is disposed away from its opposed component through a gap.

As described above, the bearing 29a is accommodated in the bearing accommodation part 8a of the first side plate 8. The bearing 29b is accommodated in the first boss 7a of the second side cover 7. For example, the bearings 29a and 29b are rolling-element bearings. As shown in FIG. 4, the bearings 29b and 34b, disposed in alignment within the first boss 7a, are retained by retainer members 38a and 38b.

The bearing 29c is mounted to the support part 13a of the mechanism mount plate 13. For example, the bearing 29c is a plain bearing. As shown in FIG. 3, gaps are produced between both ends of the spool shaft 16 and their opposed components. The spool shaft 16 has a first step 16a (see FIG. 2) and a second step 16b (see FIG. 3) for restricting axial movement. The first step 16a is formed on a part to which the bearing 29a is mounted, whereas the second step 16b is formed on a part to which the bearing 29b is mounted.

<Construction of Casting Control Mechanism>

The casting control mechanism 24 is configured to brake the spool shaft 16. As shown in FIGS. 3 and 4, the casting control mechanism 24 includes a one-way clutch 40 of a roller clutch type, the operating member 42, a pressing member 44, an urging member 46 and a washer member 48.

The one-way clutch 40 is disposed within the first boss 7a so as to be axially aligned with the bearing 29b. The one-way clutch 40 includes a first inner race 50, a first outer race 52 and a first rolling element 54. The first inner race 52 is unitarily rotatable with the spool shaft 16. The first outer race 52 is disposed on the outer peripheral side of the first inner race 50, and is rotatable with respect to the reel unit 1. The first rolling element 54 is disposed between the first inner race 50 and the first outer race 52. For example, the first rolling element 54 is a cylindrical roller. The one-way clutch 40 is configured to receive rotation of the spool shaft 16 only in the fishing-line releasing direction through the first outer race 52. In the first preferred embodiment, the first inner race 50 is integrated with the spool shaft 16. The first outer race 52 is restricted from moving oppositely to the pressing member 44 in the axial direction of the spool shaft 16 with respect to the reel unit 1. Specifically, the first outer race 52 is disposed away from the inner peripheral surface of the first boss 7a through a gap, and is restricted from moving oppositely to the pressing member 44 in the axial direction of the spool shaft 16 by the urging member 46 through the washer member 48.

The bearing 29b is mounted to a first end 16c side part of the spool shaft 16 (i.e., a right end part in FIG. 2; a handle-side end part of the spool shaft 16). The bearing 29b includes a second outer race 29d, a second inner race 29e and a second rolling element 29f. The second outer race 29d is non-rotatably mounted to the first boss 7a of the reel unit 1 on the opposite side of the operating member 42 through the one-way clutch 40. The second inner race 29e is disposed on the outer peripheral part of the spool shaft 16. The second rolling element 29f is disposed between the second outer race 29d and the second inner race 29e. The second inner race 29e is restricted from moving oppositely to the pressing member 44 with respect to the spool shaft 16 by the second step 16b. Furthermore, the spool shaft 16 is restricted from moving oppositely to the pressing member 44 by the first step 16a.

The operating member 42 is disposed on the outer peripheral side of the first end 16c of the spool shaft 16, and is engaged with the first boss 7a so as to be movable in the spool shaft direction when operated and rotated. The operating member 42 is a closed-end tubular member, and is mounted to the outer peripheral surface of the first boss 7a. The operating member 42 has a female threaded part 42a and a seal contact part 42*b* on the inner peripheral surface thereof. The female threaded part 42*a* is screwed onto the male threaded part 7*c*. The seal contact part 42*b* is contactable to the seal member 36. Furthermore, the operating member 42 has a circular mount recess 42*c* that the pressing member 44 is mounted to the bottom thereof. The seal member 36 prevents intrusion of foreign objects into the interior of the reel unit 1 and applies rotational resistance in order to prevent the operating member 42 from rotating against angler's intention.

The pressing member 44 is configured to press the first outer race 52 in accordance with rotation of the operating member 42. The pressing member 44 is made of, for instance, carbon cloth. The pressing member 44 is an annular friction plate of a washer type and is mounted to the mount recess 42*c* of the operating member 42.

The urging member 46 is a disc spring, for instance, and is disposed between the one-way clutch 40 and the bearing 29*b* so as to be extendable and compressible. The outer peripheral part of the urging member 46 indirectly makes contact with the first outer race 52 through the washer member 48, whereas the inner peripheral part of the urging member 46 directly makes contact with the second inner race 29*e*. The urging member 46 minutely adjusts the braking three by extending a range of braking force to be adjusted by the operating member 42.

A distance L1 between the first end 16*c* of the spool shaft 116 and the mount recess 42*c* of the operating member 42 is herein set to be greater than a displacement L2 of the urging member 46 between its non-compressed state and its maximally compressed state (L1>L2). With the setting, even when the urging member 46 is completely compressed, the first end 16*c* of the spool shaft 16 does not make contact with the mount recess 42*c*. For example, the washer member 48 is a member made of carbon cloth exerting high sliding performance.

<Actions of Casting Control Mechanism>

In casting, the fishing line is reeled out from the spool 12 by the weight of a terminal tackle, and the spool shaft 16 is rotated in the fishing-line casting direction. The fishing-line casting directional rotation of the spool shaft 16 is transmitted to the first outer race 52 through the first rolling element 54 in the one-way clutch 40, and the first outer race 52 is thereby rotated. The first outer race 52 is pressed by the pressing member 44 and is braked with braking force set in accordance with an operating position of the operating member 42. At this time, large braking force is obtainable because the braking force is produced by pressing and holding the first outer race 52 from its both lateral sides.

By contrast, in winding the fishing line, the fishing-line winding directional rotation of the spool shaft 16 is not transmitted to the first outer race 52, and the spool shaft 16 rotates and idles. Hence, braking force is not produced in winding the fishing line. Consequently, the casting control mechanism 24 does not produce rotational resistance against the spool shaft 16 in winding the fishing line.

First Modification of First Preferred Embodiment

It should be noted that in the following explanation, the same reference signs are assigned to components constructed similarly to their corresponding components of the first preferred embodiment, whereas three-digit reference signs are assigned to components constructed differently from their corresponding components of the first preferred embodiment. The last two digits of the three-digit sips herein correspond to reference signs assigned to the corresponding components of the first preferred embodiment.

Figure 5:
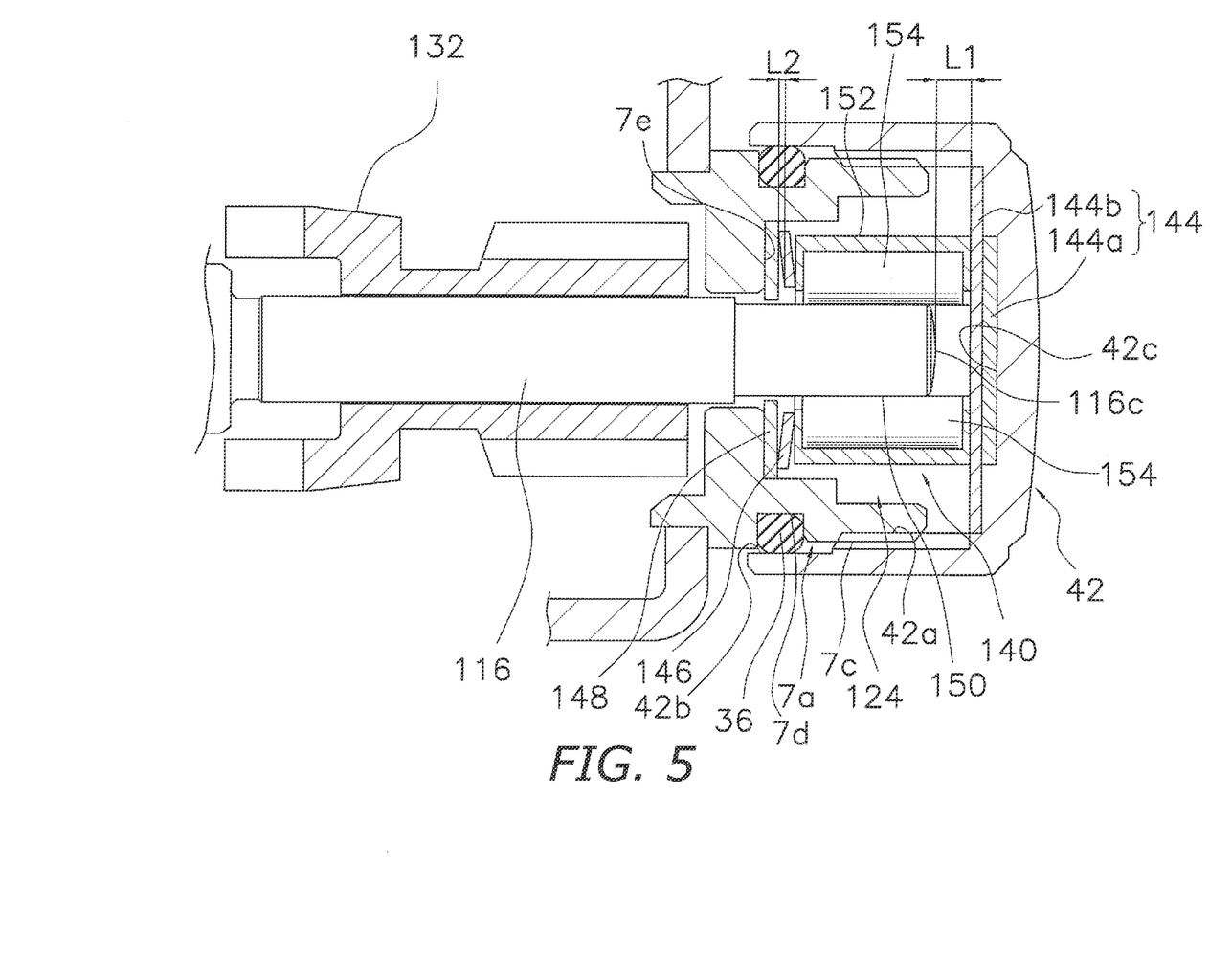
FIG. 5 is an enlarged cross-sectional view of a casting control mechanism according to a first modification of the first preferred embodiment.

In the first modification of the first preferred embodiment shown in FIG. 5, a spool shaft 116 is supported by a one-way clutch 140 and the bearing 29*a*. Furthermore, a pinion gear 132 is supported by the bearing 34*a*.

A casting control mechanism 124 includes the one-way clutch 140, the operating member 42, a pressing member 144, an urging member 146 and a washer member 148. The one-way clutch 140 is a roller clutch of an inner race free-wheeling type, and includes a first inner race 150, a first outer race 152 and a first rolling element 154. The first inner race 150 is integrated with the spool shaft 116. The first outer race 152 is disposed on the outer peripheral side of the first inner race 150 so as to be away from the inner peripheral surface of the first boss 7*a* through a gap, and is rotatable with respect to the first boss 7*a*. The first rolling element 154 is disposed between the first inner race 150 and the first outer race 152.

The operating member 42 has the same construction as that of the first preferred embodiment, and has the circularly dented mount recess 42*c*.

The pressing member 144 is composed of a first pressing member 144*a* and a second pressing member 144*b*. The first pressing member 144*a* is mounted to the mount recess 42*c* of the operating member 42. The second pressing member 144*b* is disposed between the first pressing member 144*a* and the first outer race 152. The first pressing member 144*a* and the second pressing member 144*b* are disc-shaped members made of, for instance, carbon cloth.

The urging member 146 is a disc spring, for instance, and is disposed between the first outer race 152 and the washer member 148 so as to be extendable and compressible. The outer peripheral part of the urging member 146 indirectly makes contact with a wall surface 7*e* of the first boss 7*a* through the washer member 148, whereas the inner peripheral part of the urging member 146 directly makes contact with a lateral surface of the first outer race 152.

The distance L1 between the second pressing member 144*b* and a first end 116*c* of the spool shaft 116 is herein set to be greater than the displacement L2 of the urging member 146 between its non-compressed state and its maximally compressed state (L1>L2). With the setting, even when the urging member 146 is completely compressed, the first end 116*c* of the spool shaft 116 does not make contact with the second pressing member 144*b*.

The washer member 148 is a member made of, for instance, carbon graphite cloth. The washer member 148 makes contact with the wall surface 7*e* of the first boss 7*a*, and is restricted from moving oppositely to the pressing member 144.

In the casting control mechanism 124 according to the first modification, when the spool shaft 116 is rotated in the fishing-line casting direction, the fishing-line casting directional rotation is transmitted to the first outer race 152 through the first rolling element 154 in the one-way clutch 140, and the first outer race 152 is thereby rotated. The first outer race 152 is pressed by the pressing member 144 and is braked with braking force set in accordance with an operating position of the operating member 42. At this time, large braking force is obtainable because the braking force is produced by pressing and holding the first outer race 152 from its both lateral sides.

By contrast, in winding the fishing line, the fishing-line winding directional rotation of the spool shaft 116 is not transmitted to the first outer race 152, and the spool shaft 116 rotates and idles. Hence, a braking force is not produced in winding the fishing line. Consequently, the casting control mechanism 124 does not produce rotational resistance against the spool shaft 116 in winding the fishing line.

Second Modification of First Preferred Embodiment

Figure 6:
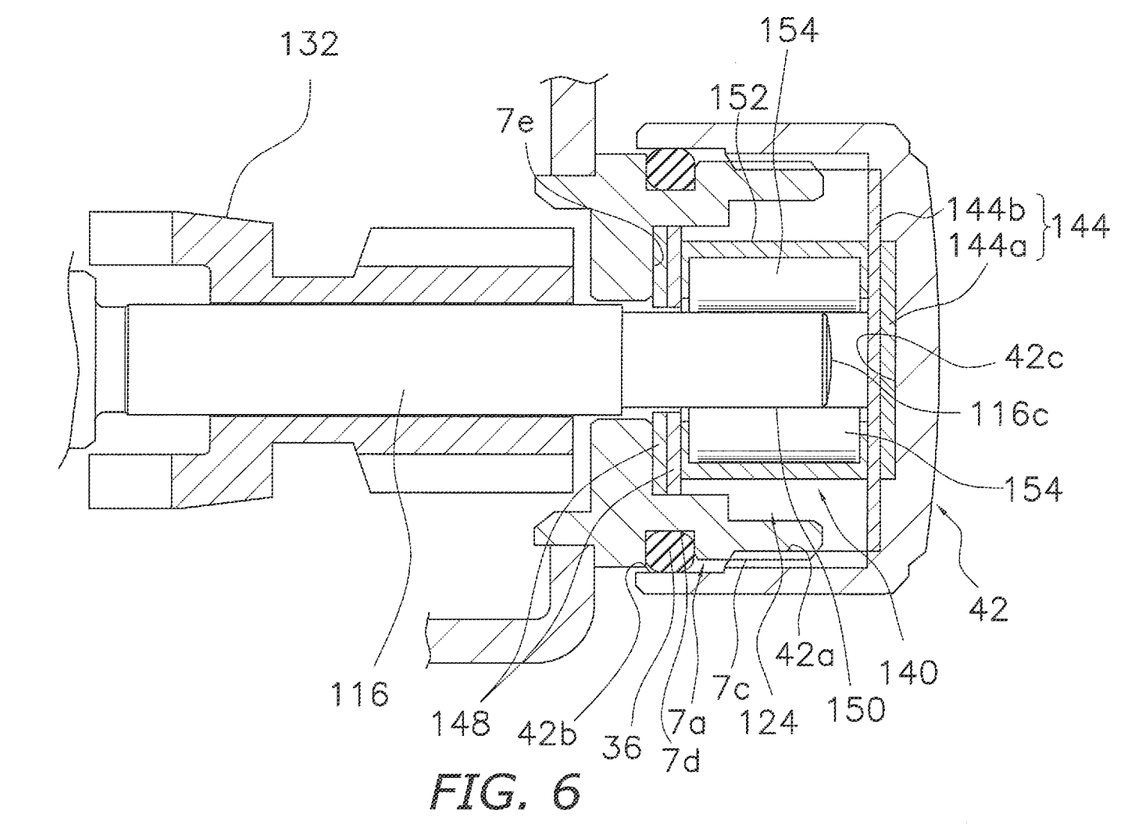
FIG. 6 is an enlarged cross-sectional view of a casting control mechanism according to a second modification of the first preferred embodiment.

As shown in FIG. 6, a casting control mechanism of the second modification has a construction roughly the same as that of the first modification, but includes two washer members 148 instead of the urging member 146. Except for the above, the construction of the casting control mechanism of the second modification is the same as that of the casting control mechanism of the first modification, and therefore, explanation thereof will not be hereinafter provided. It should be noted that the casting control mechanism of the second modification does not include the urging member 46, and hence, the adjustable range of braking force is narrowed, making it difficult to minutely adjust the braking force.

Second Preferred Embodiment

Figure 7:
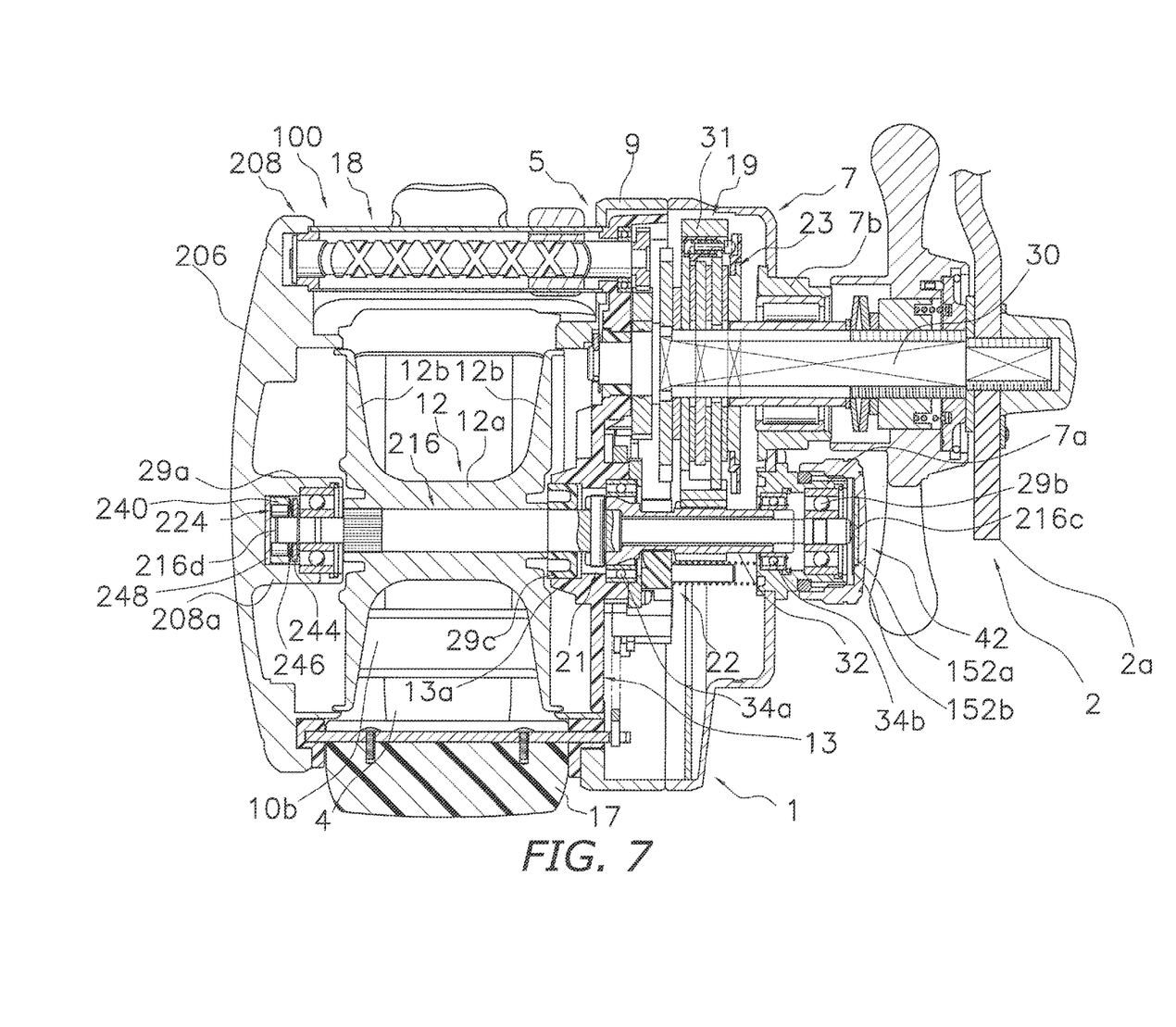
FIG. 7 is a perspective view of a dual-bearing reel according to a second preferred embodiment of the present invention.

As shown in FIG. 7, a casting control mechanism 224 according to a second preferred embodiment includes a one-way clutch 240, the operating member 42, a pressing member 244, an urging member 246 and a washer member 248. The operating member 42 has the same construction as that of the first preferred embodiment, and is mounted to the handle 2 side. Similarly to a well-known casting control mechanism, the casting control mechanism 224 includes two disc-shaped friction plates 152a and 152b mounted to the operating member 42.

Except for the operating member 42, the other components of the casting control mechanism 224 are mounted to a beating accommodation part 208a of a first side plate 208 on a first side cover 206 side that is opposite to the handle 2 side. The bearing accommodation part 208a has an axial length longer than that of the bearing accommodation part 8a of the first preferred embodiment.

A first end 216c of a spool shaft 216 is configured to be pressed by the friction plates 152a and 152b mounted to the operating member 42. Thus, the spool shaft 216 is axially movable in accordance with the displacement of the operating member 42. A second end 216d of the spool shaft 216 is disposed away from the bearing accommodation part 208a through a gap.

Figure 8:
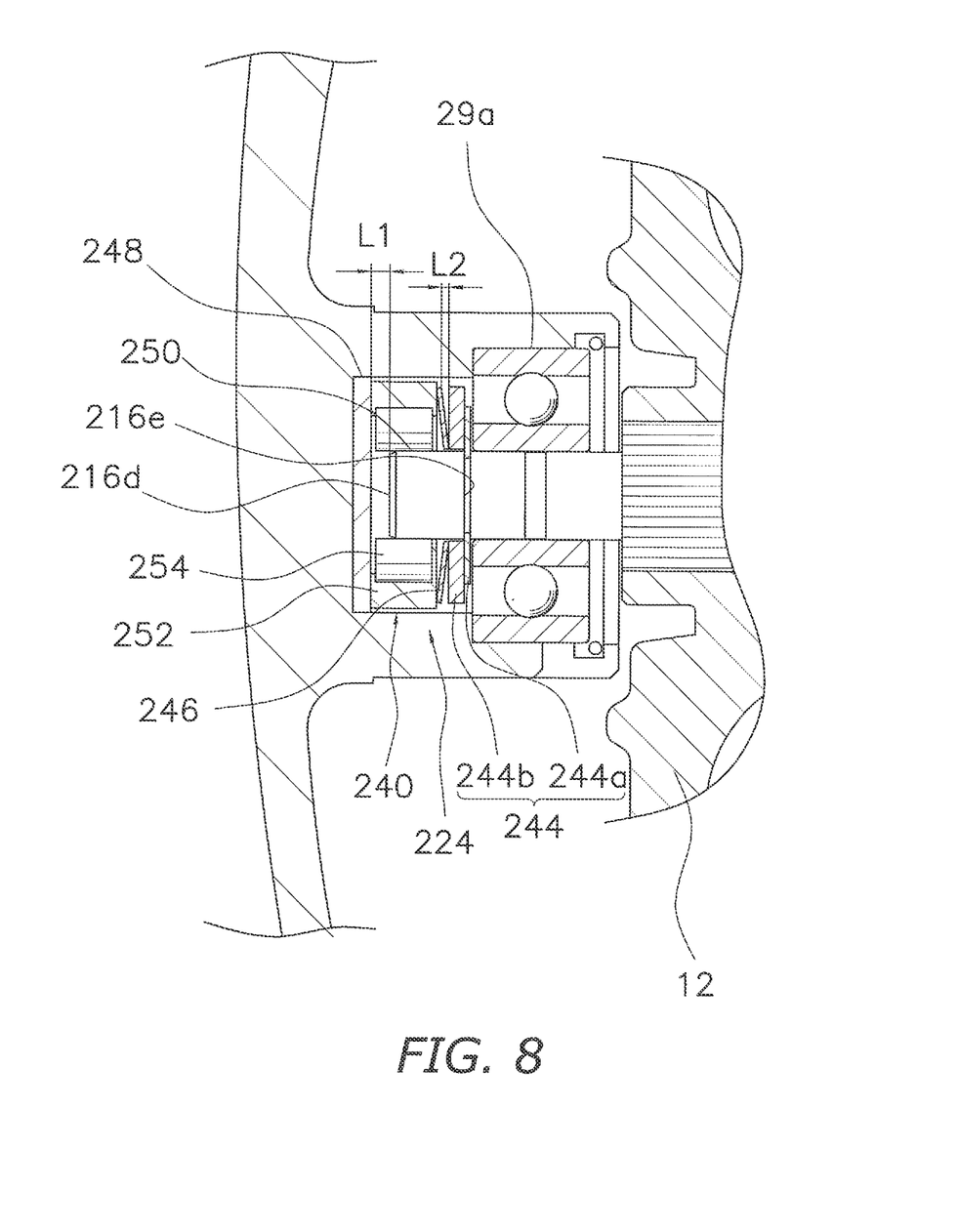
FIG. 8 is an enlarged cross-sectional view of a casting control mechanism according to the second preferred embodiment.

As shown in FIG. 8, the one-way clutch 240 is disposed more closely to the first side cover 206 side than the bearing 29a on the second end 216d side of the spool shaft 216. The one-way clutch 240 is a roller clutch of an inner race free-wheeling type, and includes a first inner race 250, a first outer race 252 and a first rolling element 254. The first inner race 250 is integrated with the spool shaft 216. The first outer race 252 is disposed away from the inner peripheral surface of the bearing accommodation part 208a through a gap, and is rotatable with respect to the bearing accommodation part 208a. The first outer race 252 is restricted from moving oppositely to the pressing member 244 by the washer member 248.

The pressing member 244 is composed of a retaining ring 244a and a body member 244b. The retaining ring 244a is made of spring material, and is fitted to a mount groove 216e so as to be axially immovable. The mount groove 216e is herein annularly formed on the spool shaft 216, and is located on the second end 216d side of the bearing 29a. The body member 244b is disposed in contact with the retaining ring 244a. The body member 244b is a washer-shaped member made of, for instance, carbon cloth.

The urging member 246 is a disc spring disposed between the pressing member 244 and the first outer race 252 so as to be extendable and compressible. The washer member 248 is a washer-shaped member made of, for instance, carbon cloth. The washer member 248 is disposed so as to interpose the first outer race 252 between itself and the urging member 246, and makes contact with the bottom of the bearing accommodation part 208a.

The distance L1 between the washer member 248 and the second end 216d of the spool shaft 216 is herein set to be greater than the displacement L2 of the urging member 246 between its non-compressed state and its maximally compressed state (L1>L2). With the setting, even when the urging member 246 is completely compressed, the second end 216d of the spool shaft 216 does not make contact with the washer member 248.

In the control mechanism 224 according to the second preferred embodiment, when the spool shaft 216 is rotated in the fishing-line casting direction, the fishing-line casting directional rotation is transmitted to the first outer race 252 through the first rolling element 254 in the one-way clutch 240, and the first outer race 252 is thereby rotated. The first outer race 252 is pressed by the pressing member 244, and is braked with braking force set in accordance with an opening position of the operating member 42. At this time, large braking force is obtainable because the braking force is produced by pressing and holding the first outer race 252 from both lateral sides.

By contrast, in winding the fishing line, the fishing-line winding directional rotation of the spool shaft 216 is not transmitted to the first outer race 252, and the spool shaft 216 rotates and idles. Hence, braking force is not produced in winding the fishing line. Consequently, the casting control mechanism 224 does not produce rotational resistance against the spool shaft 216 in winding the fishing line.

<Features>

The aforementioned preferred embodiments can be expressed as follows.

(A) The dual-bearing reel 100 includes the reel unit 1, the spool 12 for winding the fishing line, the spool shaft 16 and the casting control mechanism 24 (the exemplary brake device). The spool 12 for winding the fishing line is rotatable with respect to the reel unit 1. The spool shaft 16 is rotatably supported by the reel unit 1 and is configured to be unitarily rotated with the spool 12. The casting control mechanism 24 is configured to brake the spool shaft 16. The casting control mechanism 24 includes the one-way clutch 40, the operating member 42 and the pressing member 44. The one-way clutch 40 has the first inner race 50, the first outer race 52 and the first rolling element 54. The first inner race 50 is unitarily rotatable with the spool shaft 16. The first outer race 52 is disposed on the outer peripheral side of the first inner race 50, and is rotatable with respect to the reel unit 1. The first rolling element 54 is disposed between the first inner race 50 and the first outer race 52. Furthermore, the one-way clutch 40 is configured to receive rotation of the spool shaft 16 only in the fishing-line casting direction through the first outer race 52. The operating member 42 is disposed on the outer peripheral side of the first end 16c of the spool shaft 16, and is screwed onto the reel unit 1 so as to be movable in the spool shaft direction when being operated and rotated. The pressing member 44 is configured to press the first outer race 52. In conjunction with movement of the operating member 42. The first outer race 52 is restricted from moving oppositely to the pressing member 44 in the spool shaft direction with respect to the reel unit 1.

In the dual-bearing reel 100, when the spool shaft 16 is rotated in the fishing-line winding direction, the first inner race 50 freely rotates and the rotation of the spool shaft 16 is not transmitted to the first outer race 52. Thus, the casting control mechanism 24 does not apply rotational resistance to the spool shaft 16. By contrast, when the spool shaft 16 is rotated in the fishing-line casting direction, the rotation of the spool shaft 16 is transmitted to the first outer race 52 from the first inner race 50 through the first rolling element 54. When the rotation is transmitted to the first outer race 52, the first outer race 52 is braked while being pressed by the pressing member 44 and being restricted from moving oppositely to the pressing member 44 in the spool shaft direction with respect to the reel unit 1. Accordingly, the spool shaft 16 is braked. The one-way clutch herein used is of a roller type, and hence, the casting control mechanism 24 does not produce rotational resistance against the spool shaft 16 in winding the fishing line. Furthermore, the first outer race 52 is herein configured to be braked, and thus, the braking force occurs at a large diameter. Accordingly, the casting control mechanism 24e can obtain a significant braking force. Moreover, the frictional area is enlarged, and this stabilizes the braking free and enhances component durability.

(B) The first inner race 50 may be integrated with the spool shaft 16. In the construction, the one-way clutch 40 can be simply constructed.

(C) The pressing member 44 may be a fiction plate mounted to the operating member 42. In the construction, the first outer race 52 can be braked on the side that the operating member 42 is disposed.

(D) The spool shaft 16 may be rotatably supported by the bearing 29b. The bearing 29b has the second outer race 29d, the second inner race 29e and the second rolling element 29f. The second outer race 29d is located on the opposite side of the operating member 42 through the one-way clutch 40, and is non-rotatably mounted to the reel unit 1. The second inner race 29e is mounted to the outer periphery of the spool shaft 16 so as to be disposed closely to the first end 16c. The second rolling element 29f is disposed between the second outer race 29d and the second inner race 29e. Furthermore, the second inner race 29e may be restricted from moving oppositely to the pressing member 44 with respect to the spool shaft 16. In the construction, the first outer race 52 can be braked while being restricted from axially moving by the pressing member 44 and the bearing 29b that is restricted from moving oppositely to the pressing member 44 with respect to the spool shaft 16.

(E) The casting control mechanism 24 may include the urging member 46 disposed between the one-way clutch 40 and the bearing 29b. In the construction, the range of braking force to be adjusted by the operating member 42 is widened, and this enables minute adjustment of braking force.

(F) The casting control mechanism 124 may include the washer member 148 that is disposed on the opposite side of the operating member 42 through one-way clutch 140 and is mounted to the reel unit 1 so as to be immovable oppositely to the pressing member 144. In the construction, the one-way clutch 140 is not required to directly make contact with the reel unit 1. This enables accurate braking of the first outer race 152.

(G) The casting control mechanism 124 may include the urging member 146 disposed between the one-way clutch 140 and the washer member 148. In the construction, the range of the braking force to be adjusted by the operating member 42 is widened, and this enables minute adjustment of the braking force.

(H) The operating member 42 may be configured to press the first end 216c side of the spool shaft 216. The one-way clutch 240 may be mounted to the spool shall 216 so as to be disposed closely to the second end 216d opposite to the first end 216c. Furthermore, the pressing member 244 may be mounted to the spool shaft 216 so as to be capable of pressing the one-way clutch 240 toward the second end 216d. In the construction, the one-way clutch 240 can be disposed on the opposite side of the side that the operating member 42 is disposed (e.g., the handle side) in the dual-bearing reel 100. Thus, it is possible to prohibit an increase in the dimension of the dual-bearing reel 100 in the spool shall direction.

(I) The casting control mechanism 224 may include the urging member 246 disposed between the pressing member 244 and the one-way clutch 240, in the construction, the range of the braking three to be adjusted by the operating member 42 is widened, and this enables minute adjustment of the braking force.

(J) The urging member 46, 146, 246 may be a disc spring disposed so as to be compressible. In the construction, the urging member 46, 146, 246 can be disposed in a slight gap produced in the spool shaft direction. Thus, even when the urging member 46, 146, 246 is provided, it is possible to prohibit an increase in the dimension of the casting control mechanism 24, 124, 224 in the spool shaft direction.

Other Preferred Embodiments

Preferred embodiments of the present invention have been explained above. However, the present invention is not limited to the aforementioned preferred embodiments, and a variety of changes can be herein made without departing from the scope of the present invention. Especially, a plurality of preferred embodiments and modifications described in the present specification can be arbitrarily combined on an as-needed basis.

(a) in the aforementioned preferred embodiments, the first inner race 50, 150, 250 is integrated with the spool shaft 16, 116, 216. However, the first inner race may be separate from the spool shaft.

(b) In the aforementioned preferred embodiments, the operating member 42 is disposed on the second side cover 7 located on the handle side. However, the positional arrangement of the operating member 42 is not limited to the above in the present invention. The operating member 42 may be disposed on the first side cover 6 located on the opposite side of the handle 2.

(c) In the second preferred embodiment, the urging member 246 is disposed between the pressing member 244 and the first outer race 252. However, the positional arrangement of the urging member 246 is not limited to the above in the present invention. The urging member 246 may be disposed between the first outer race 252 and the washer member 248. Alternatively, the urging member 246 may be disposed between the operating member 42 and the first end 216c of the spool shaft 216.

(d) In the aforementioned preferred embodiments, the disc spring has been exemplified as the urging member 46, 146, 246. However, the urging member is not limited to the disc spring. For example, a coil spring, a wave spring or so forth may be used as the urging member. Furthermore, a plurality of urging members may be disposed in series or parallel when there is enough space for the urging members. Moreover, in the construction that the casting control mechanism is disposed on the handle side, the urging member may be disposed between the pressing member and the one-way clutch.

What is claimed is:

1. A dual-bearing reel, comprising:
a reel unit;
a spool configured to wind a fishing line rotatable with respect to the reel unit;
a spool shaft rotatably supported by the reel unit and being configured to be unitarily rotated with the spool; and
a brake device configured to brake the spool shaft,
the brake device including
a one-way clutch having a first inner race, a first outer race and a first rolling element, the one-way clutch being configured to receive rotation of the spool shaft only in a fishing-line casting direction through the first outer race, the first inner race being unitarily rotatable with the spool shaft, the first outer race being disposed on an outer peripheral side of the first inner race and being rotatable with respect to the reel unit, the first rolling element being disposed between the first inner race and the first outer race,
an operating member disposed on an outer peripheral side of a first end of the spool shaft, the operating member being engaged with the reel unit so as to be movable in a spool shaft direction when being operated and rotated, and
a pressing member configured to press the first outer race in conjunction with movement of the operating member,
the first outer race being restricted from moving oppositely to the pressing member in the spool shaft direction with respect to the reel unit.

2. The dual-bearing reel according to claim 1, wherein the first inner race is integrated with the spool shaft.

3. The dual-bearing reel according to claim 2, wherein the operating member is configured to press a side of the spool shaft at the first end,
the one-way clutch is mounted to the spool shaft so as to be disposed adjacent a second end opposite to the first end, and
the pressing member is mounted to the spool shaft so as to be capable of pressing the one-way clutch toward the second end.

4. The dual-bearing reel according to claim 2, wherein the pressing member is a friction plate mounted to the operating member.

5. The dual-bearing reel according to claim 2, wherein the spool shaft is rotatably supported by a rolling bearing, the rolling bearing having a second outer race, a second inner race and a second rolling element, the second outer race being located on an opposite side of the operating member through the one-way clutch and being non-rotatably mounted to the reel unit, the second inner race being mounted to an outer periphery of the spool shaft so as to be disposed closely to the first end, the second rolling element being disposed between the second outer race and the second inner race, and
the second inner race is restricted from moving oppositely to the pressing member with respect to the spool shaft.

6. The dual-bearing reel according to claim 2, wherein the brake device includes a washer member, the washer member being disposed on an opposite side of the operating member through the one-way clutch and being mounted to the reel unit so as to be immovable oppositely to the pressing member.

7. The dual-bearing reel according to claim 3, wherein the brake device includes an urging member disposed between the pressing member and the one-way clutch.

8. The dual-bearing reel according to claim 7, wherein the urging member is a disc spring disposed so as to be compressible.

9. The dual-bearing reel according to claim 1, wherein the pressing member is a friction plate mounted to the operating member.

10. The dual-bearing reel according to claim 9, wherein the spool shaft is rotatably supported by a rolling bearing, the rolling bearing having a second outer race, a second inner race and a second rolling element, the second outer race being located on an opposite side of the operating member through the one-way clutch and being non-rotatably mounted to the reel unit, the second inner race being mounted to an outer periphery of the spool shaft so as to be disposed closely to the first end, the second rolling element being disposed between the second outer race and the second inner race, and
the second inner race is restricted from moving oppositely to the pressing member with respect to the spool shaft.

11. The dual-bearing reel according to claim 9, wherein the brake device includes a washer member, the washer member being disposed on an opposite side of the operating member through the one-way clutch and being mounted to the reel unit so as to be immovable oppositely to the pressing member.

12. The dual-bearing reel according to claim 1, wherein the spool shaft is rotatably supported by a rolling bearing, the rolling bearing having a second outer race, a second inner race and a second rolling element, the second outer race being located on an opposite side of the operating member through the one-way clutch and being non-rotatably mounted to the reel unit, the second inner race being mounted to an outer periphery of the spool shaft so as to be disposed closely to the first end, the second rolling element being disposed between the second outer race and the second inner race, and
the second inner race is restricted from moving oppositely to the pressing member with respect to the spool shaft.

13. The dual-bearing reel according to claim 12, wherein the brake device includes an urging member disposed between the one-way clutch and the rolling bearing.

14. The dual-bearing reel according to claim 13, wherein the urging member is a disc spring disposed so as to be compressible.

15. The dual-bearing reel according to claim 1, wherein the brake device includes a washer member, the washer member being disposed on an opposite side of the operating member through the one-way clutch and being mounted to the reel unit so as to be immovable oppositely to the pressing member.

16. The dual-bearing reel according to claim 15, wherein the brake device includes an urging member disposed between the one-way clutch and the washer member.

17. The dual-bearing reel according to claim 16, wherein the urging member is a disc spring disposed so as to be compressible.

* * * * *